United States Patent [15] 3,696,580
Saltzer, Sr. [45] Oct. 10, 1972

[54] SHRINK FILM PACKAGING METHOD

[72] Inventor: Joseph M. Saltzer, Sr., 10775 69th Avenue North, Osseo, Minn. 55369

[22] Filed: May 17, 1971

[21] Appl. No.: 143,757

[52] U.S. Cl..................53/27, 53/30, 206/46 FR, 206/65 S
[51] Int. Cl. ...........................................B65b 43/02
[58] Field of Search.........53/27, 30; 206/46 FR, 65 S

[56] References Cited

UNITED STATES PATENTS 3,340,669   9/1967   Farquharson..............53/27 X
3,492,776   2/1970   Harrison et al................53/30

Primary Examiner—Travis S. McGehee
Attorney—Wayne B. Easton

[57] ABSTRACT

The invention relates to a shrink film packaging method by which articles intended for shipment by common carrier or to be sent through the mail may be wrapped so as to be protected from the usual and normal effects of handling. Articles to be wrapped are loaded onto a cardboard or plastic tray which is placed between the folds of two layers of material. The inner layer of material surrounding the tray and articles thereon is a special cushioning material which comprises closely spaced air bubbles formed by two sheets of polyethylene with air pockets formed therebetween. The outer layer of material is a shrink film and a sealer is utilized to form sealed edges around the tray and articles to form a package. The excess wrapping material is trimmed simultaneously as it is being sealed and the package is directed to a heat tunnel where the heat causes shrinkage of the outer shrink film which in turn causes the air in at least some of the bubbles of the inner material to be compressed to a pressure greater than atmospheric pressure.

2 Claims, 5 Drawing Figures

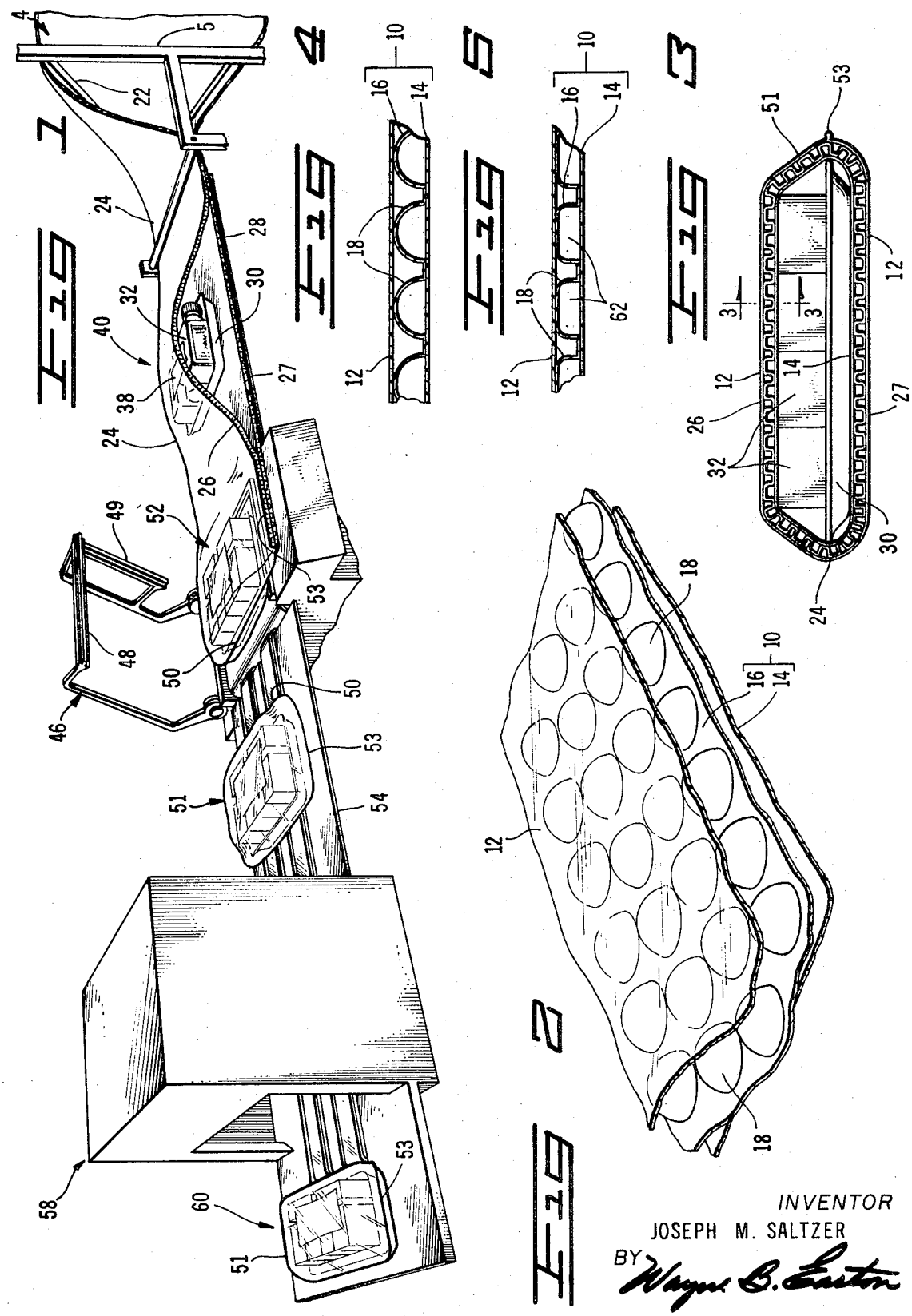

SHRINK FILM PACKAGING METHOD

The invention relates to a new and improved shrink packaging method.

The overwrapping of consumer and industrial products with transparent flexible materials such as cellophane has been a standard packaging technique for many years. In recent years a shrinkable film overwrapping has been developed which is formed and sealed around an article or product. The product with the film overwrapping is then passed through a hot air tunnel and, upon exposure to heated air in the tunnel, the film shrinks to the configuration of the article or product.

The shrinkable film is a thermoplastic film which has been stretched in the manufacturing process. This stretching is called orientation and imparts toughness and a high initial tear resistance to the film. It also gives the film a high gloss and the ability to shrink as much as eighty percent when heated.

Articles or products which are boxed, trayed, banded, bundled, carded or even totally unsupported can all be packaged in shrinkable films. The shrink film alone, however, does not provide a high degree of protection from mechanical forces to which a wrapped article is subjected by handling during the shipping or mailing thereof. In the present invention shrink film is utilized for wrapping an article but a cushioning material is provided between the shrink film and the article. In this respect it will be understood that the method of the present invention is utilized in nature in that it is directed to a protective wrapping method for packaging articles which are to be shipped by common carriers or to be sent through the mails.

The cushioning material utilized is referred to herein as a multiple air bubble material or layer. This air bubble layer comprises two polyethylene sheets bonded together with one sheet being a planar base sheet and the other sheet being a bubble sheet embossed or formed with multiple, spaced apart, generally semi-spherically shaped recesses. The nonrecessed portions of the bubble sheet are laminated to the base sheet with air being present in the enclosed pockets thus formed between the two sheets. This cushioning material is sold in sheet form by the Sealed Air Corporation, Fair Lawn, New Jersey, under the trademark AIR CAP. This material will at times be referred to herein as air bubble cushioning material.

A main object of the invention is to provide a new and improved shrink film packaging method for the protective wrapping of articles to be shipped by common carriers or to be sent through the mails.

Other objects and advantages of the invention will become apparent from the following specification, drawings and appended claims.

In the drawings:

FIG. 1 is a perspective view of an assembly line, somewhat schematically illustrated for packaging articles in accordance with the method of the present invention;

FIG. 2 is a perspective view showing the multiple air bubble cushioning material used with the method of the present invention;

FIG. 3 is a sectional view through a package assembled in accordance with the invention but because of the smallness of the scale no attempt is made to indicate whether the package has been subjected to heat in the shrink tunnel;

FIG. 4 is a sectional view taken on line 3—3 of FIG. 3 prior to the time the package is subjected to heat treatment in the shrink tunnel; and FIG. 5 is a sectional view taken on line 3—3 of FIG. 3 after the package has been subjected to heat treatment in the shrink tunnel.

Referring to FIG. 1, the assembly line for the packaging method starts with a known type of folding apparatus 4 having vertically extending center folder 5. Two rolls of sheet material precede the center folder 5 but the rolls themselves are not shown. The two sheet materials contained respectively on the two rolls are (1) a multiple air bubble cushioning material 10 and (2) a shrink film material 12. The multiple air bubble cushioning material is a development of the Sealed Air Corporation of Fair Lawn, New Jersey and is sold under the trademark AIR CAP. The AIR CAP material 10 comprises two layers of plastic material as shown in each of the figures of the drawing which are a flat base layer 14 and a tent sheet layer 16 which forms, with the base layer 14, a network of spaced apart "tents" or air bubbles 18. Normally the portions of the tent sheet material which form the bubbles are in a relatively slack condition such that the air of the bubbles does not distent or make the material taut. The application of an external squeezing force to the bubbles 18 causes compression of the air in the bubbles to a pressure somewhat above atmospheric pressure and does cause the plastic material of the bubbles to assume a state of tautness. FIG. 2 also shows a fragmentary portion of shrink material 12 in overlaying relation to the multiple air bubble material which consists of the sheets 14 and 16.

The rolls of material (not shown) are unrolled together to form a continuous two layer strip of material which consists of the shrink film layer 12 and the multiple air bubble layer 10 which consists of the sheets 14 and 16. The two layers of material are brought together from the rolls with the sheet 16 being between the sheets 14 and 12 as is best shown in FIGS. 4 and 5 of the drawing.

The center folding unit 5 is made of any suitable material and has the form of a bulkwork with a V-shaped snout 22 which forms a crease 24 for the center fold of the two layers 10 and 12 of material passing over the snout 22. The folder unit 5 folds the two layers 10 and 12 in half to form upper and lower halves 26 and 27. The feeding of the folded layers of material onto a horizontal support or conveyor 28 is arranged so that the opposite halves 26 and 27 of the base sheet 14, which are on opposite sides of the center crease or fold 24, are in adjacent relation to each other and the shrink film half 27 is in contact with the support 28.

A tray 30 made of cardboard or the like is loaded or has placed thereon one or more articles 32 which are to be packaged. The loaded tray 30 is placed between the opposite halves 26 and 27 of the folded two layer strip of material as close to the center crease 24 as practical. Although it may be redundant, it is specifically pointed out in the interest of clarity that material layer 14 is in contact with the upper and lower sides of the loaded tray 30 and shrink film 12 is in contact with the surface of support 28.

If desired, a mailing label 38 or any piece of paper bearing informative printing thereon may be inserted between the shrink film 12 and the multiple air bubble material 10 (layer 14 thereof) at the indicated point 40. The shrink film 12, being transparent, permits the mailing label 38 or invoice or any other inserted piece of paper to be read therethrough while providing substantial protection for it.

Although different types of sealers may be utilized within the scope of the invention, the L-type sealer 46 illustrated may be used very advantageously. Sealer 46 has sealing arms or dies 48 and 49 with die 49 functioning with each stroke to seal a common edge 50 which is the trailing edge of package 51 and the leading edge of package 52. The sealer arm or die 48 functions to seal the edge 53 of each package which is opposite the crease or center fold 24.

A conveyor 54 transfers the packages to a heat shrink tunnel 58 where a temperature of approximately 350° F. is maintained. The packages remain in the tunnel for a few minutes until the shrink film reaches a temperature at which substantial shrinkage, up to eighty percent, has occurred. Package 51 is shown prior to entering the tunnel and package 60 is shown after it has passed through the tunnel.

Prior to the shrink tunnel treatment the shrink film 12 only loosely surrounds the multiple air bubble material 16 as indicated in FIG. 4. After the shrink tunnel treatment the shrink film 12 has shrunk into tightly fitting engagement with at least portions of the air bubble material 16, as indicated in FIG. 5, such that the air in some of the bubbles is compressed to a pressure greater than atmospheric pressure. In most instances only some of the bubbles are compressed because of the generally irregular shape of the package and the fact that neither of the layers 12 and 16 are tightly stretched after the sealing operation with the sealer 46 but prior to the package being subjected to heat in the shrink tunnel 58.

With further reference to FIG. 5, the general effect of the above described method is to provide a protective layer of compressed air by reason of the tops of the bubbles 18 being squashed down and the sides of the bubbles being distended laterally. The air in at least some of the bubbles 18 is held in a compressed state as a result of the shrinkage of the film 12 in the tunnel 58 and this compressed air functions as a cushioning material on all sides of the package. The section of FIG. 5 is a fragmentary section of the package 60 after it has passed through the heat tunnel 58 and the bubbles 18 thereof contain compressed air 62.

I claim:

1. A method for packaging articles comprising the steps of loading at least one of said articles onto a tray, providing a continuous two layer strip of material having a shrink film layer and a multiple air bubble layer, said air bubble layer comprising a base sheet and a tent sheet which forms with said base sheet a network of spaced apart air bubbles, said tent sheet being in contact with said shrink film layer, longitudinally folding said strip of material to form a center fold with the opposite halves of said base sheet being in adjacent relation to each other, placing said loaded tray between said opposite halves of said base sheet close to said center fold, forming sealed and trimmed edges to form a package, and placing said package in a heated shrink tunnel where the shrinkage of said shrink film compresses said air bubbles so that the air of at least some of said bubbles has a higher than atmospheric pressure.

2. A method according to claim 1 wherein a mailing label or the like is inserted between said shrink film layer and said tent sheet prior to said forming of said sealed edges.

* * * * *